(12) United States Patent
Anderson et al.

(10) Patent No.: US 7,576,149 B2
(45) Date of Patent: Aug. 18, 2009

(54) VARNISH

(75) Inventors: Christine D. Anderson, Hamilton (CA); T. Brian McAneney, Burlington (CA)

(73) Assignee: Xerox Corporation, Norwalk, CT (US)

( * ) Notice: Subject to any disclaimer, the term of this patent is extended or adjusted under 35 U.S.C. 154(b) by 527 days.

(21) Appl. No.: 11/421,299

(22) Filed: May 31, 2006

(65) Prior Publication Data

US 2007/0282037 A1 Dec. 6, 2007

(51) Int. Cl.
*C08F 290/06* (2006.01)

(52) U.S. Cl. .................. 524/81; 524/460; 524/554; 523/160; 106/31.14

(58) Field of Classification Search .................. None
See application file for complete search history.

(56) References Cited

U.S. PATENT DOCUMENTS

| | | | |
|---|---|---|---|
| 4,243,694 A | 1/1981 | Mansukhani | |
| 4,251,824 A | 2/1981 | Hara et al. | |
| 4,303,924 A | 12/1981 | Young, Jr. | |
| 4,410,899 A | 10/1983 | Haruta et al. | |
| 4,412,224 A | 10/1983 | Sugitani | |
| 4,490,731 A | 12/1984 | Vaught | |
| 4,532,530 A | 7/1985 | Hawkins | |
| 4,601,777 A | 7/1986 | Hawkins et al. | |
| 4,911,830 A | 3/1990 | Bromley et al. | |
| 4,916,171 A * | 4/1990 | Brown et al. | 523/161 |
| 4,978,969 A | 12/1990 | Chieng | |
| 5,006,170 A | 4/1991 | Schwarz et al. | |
| 5,122,187 A | 6/1992 | Schwarz et al. | |
| 5,270,368 A | 12/1993 | Lent et al. | |
| 5,554,480 A | 9/1996 | Patel et al. | |
| 5,623,001 A | 4/1997 | Figov | |
| 6,355,720 B1 * | 3/2002 | Canard et al. | 524/501 |
| 6,448,313 B1 * | 9/2002 | Patel | 524/89 |
| 7,235,294 B2 * | 6/2007 | Story | 428/356 |
| 2004/0197531 A1 * | 10/2004 | Vincent et al. | 428/195.1 |
| 2005/0249895 A1 * | 11/2005 | Sisler et al. | 428/32.34 |

OTHER PUBLICATIONS

Rhoplex I-545 Emulsion Product Data Sheet.*
Rhoplex I-2183N Emulsion Product Data Sheet.*
http://www.rohmhaas.com/assets/attachments/business/pbm/rhoplex_i/rhoplex_i-2426d/tds/rhoplex_I-2426d.pdf.*
http://www.rohmhaas.com/wcm/products/product_detail.page?product=1123135&application=1120756.*
http://www.rohmhaas.com/assets/attachments/business/pbm/rhoplex_i/rhoplex_i-545/tds/rhoplex_i-545.pdf.*
Earnest W. Flick, "Printing Ink and Overprint Varnish Formulations," $2^{nd}$ Edition, William Andrew Publishing/Noyes, 1999, pp. 62-81.*
U.S. Appl. No. 11/278,754, filed Apr. 5, 2006 by Anderson et al.

* cited by examiner

*Primary Examiner*—David Wu
*Assistant Examiner*—Vu Nguyen
(74) *Attorney, Agent, or Firm*—Oliff & Berridge, PLC

(57) ABSTRACT

A recording medium with an ink image thereon, wherein a varnish at least partially covers the ink image, and wherein the varnish composition prior to application comprises at least one latex emulsion, water, at least one base and at least one surfactant.

16 Claims, No Drawings

VARNISH

TECHNICAL FIELD

Described herein is a varnish for use in solid ink jet production printing systems. Specifically, disclosed herein is a recording medium with an ink image thereon, wherein a varnish at least partially covers the ink image, and wherein the varnish composition prior to application comprises at least one latex emulsion, water, at least one base and at least one surfactant. The varnish may optionally include at least one coalescing aid and/or at least one anti-foaming agent.

BACKGROUND

Prints generated by solid ink jet printers are known to rub and scratch quite easily on all papers, especially on coated stock, due to poor bonding between the ink and substrate. This characteristic results in unsatisfactory prints and customer complaints. One approach to minimize this problem is to apply a coating over the print, which forms a protective barrier. This coating therefore aids in increasing the robustness of the print.

REFERENCES

Image robustness of solid ink jet prints is lacking, when compared to toner prints, because there is very little pressure applied to the ink during the printing process (in both transfix and direct to paper configurations). This, in turn, does not allow for the ink to diffuse into the substrate. Therefore, in the final print the ink sits on top of the substrate and there is very little bonding between the ink and the substrate. In addition, the wax content of solid ink jet prints is very high and the image may remain soft after printing and be easily damaged with a small amount of force applied to the printed image.

UV curable ink-jet inks have been used in an attempt to overcome the failure of ink jet-generated images to withstand heat and sunlight. Examples of coating formulations for ink-based images include U.S. Publication No. 2005/0249895, U.S. Pat. Nos. 4,978,969, 5,623,001, 5,270,368, and 4,303,924.

SUMMARY

Disclosed herein is a recording medium with an ink image thereon, wherein a varnish at least partially covers the ink image, and wherein the varnish composition prior to application comprises at least one latex emulsion, water, at least one base and at least one surfactant.

In embodiments, disclosed herein is a process for the preparation of a varnish composition, comprising blending at least one latex emulsion with water and at least one surfactant to generate an aqueous latex emulsion, and adding at least one base to the aqueous latex emulsion.

In yet further embodiments, disclosed herein is a varnish composition, comprising at least one latex emulsion, water, at least one surfactant, and at least one base.

EMBODIMENTS

Disclosed herein is a varnish composition comprising at least one latex emulsion, water, at least one base and at least one surfactant. The varnish may optionally contain at least one viscosity modifier, at least one anti-foaming agent and/or at least one coalescing aid. The varnish composition comprises an aqueous acrylic emulsion used to wet a hydrophobic ink layer by adjusting the surface tension and viscosity of the varnish composition.

At least one latex emulsion refers to from 1 to about 10 latex emulsions that are combined, such as from 1 to about 5 latex emulsions or from 1 to about 3 latex emulsions, in the varnish composition. The overall latex emulsion mixture may have a glass transition temperature ($T_g$) of, for example, from about 30° C. to about 95° C., such as from about 35° C. to about 85° C. or from about 335° C. to about 70° C. To achieve this range of $T_g$, more than one latex emulsion may be used. In other words, various latex emulsions may be combined to achieve the desired $T_g$. For example, a latex emulsion having a $T_g$ lower than the desired final $T_g$ may be employed with additional latex emulsion(s) having a higher $T_g$, or a latex emulsion having a $T_g$ higher than the desired $T_g$, such as from about 95° C. to about 150° C., or more. Any combination of one or more latex emulsions may be combined, as long as the desired $T_g$ range for the overall latex emulsion mixture is achieved. The $T_g$ may be measured by differential scanning calorimetry (DSC) using, for example, a DSC 2920 (obtained from TA Instruments) or dynamic mechanical analysis using, for example, a Rheometric Scientific RSAII Solid Analyzer.

In embodiments, the latex emulsion may include styrene/acrylic emulsions, acrylic emulsions, polyester emulsions or mixtures thereof.

Examples of acrylic latex emulsions include poly(alkyl methacrylate-alkyl acrylate), poly(alkyl methacrylate-aryl acrylate), poly(aryl methacrylate-alkyl acrylate), poly(alkyl methacrylate-acrylic acid), and poly(alkyl acrylate-acrylonitrile-acrylic acid). The latex may contain a resin such as poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene) and the like.

Examples of styrene/acrylic latex emulsions include poly(styrene-alkyl acrylate), polystyrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(styrene-alkyl acrylate-acrylonitrile-acrylic acid), and poly(styrene-1,3-diene-acrylonitrile-acrylic acid). The latex may contain a resin such as poly(styrene-butadiene), poly(methylstyrene-butadiene), poly(styrene-isoprene), poly(methylstyrene-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid) and the like.

Examples of specific acrylic latex emulsions suitable for use herein include RHOPLEX® HA-12 and RHOPLEX® 1-2074 available from Rohm & Haas, Co. Examples of styrene/acrylic latex emulsions include ACRONAL S728, ACRONAL NX4533 and ACRONAL S888S from BASF. Water based acrylic or styrene/acrylic emulsions may be self-crosslinking and/or alkali soluble and supplied on the acid side (un-neutralized).

Examples of suitable polyester latex emulsions include polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(propoxylated bisphenol-fumarate), poly(propoxylated bisphenol-succinate), poly(propoxylated bisphenol-adipate) and poly(propoxylated bisphenol-glutarate).

In embodiments, the varnish may include one or more latex emulsions in a total amount from about 40 weight percent to about 95 weight percent, such as from about 50 weight percent to about 90 weight percent or from about 60 weight percent to about 90 weight percent. If one or more latex emulsions is utilized, each latex emulsion may be present in an amount from about 1 weight percent to about 94 weight percent of the varnish, such as from about 5 weight percent to about 90 weight percent or from about 10 weight percent to about 85 weight percent of the varnish. Each latex emulsion may be present in any amount as long as the total amount of the latex emulsion in the varnish is within the desired range and has the desired $T_g$.

The varnish disclosed herein further includes at least one base to stabilize the latex emulsions. At least one base refers to, for example, from 1 to about 10 bases that are combined, such as from 1 to about 5 bases or from 1 to about 3 bases, in the varnish composition. Examples of bases include an alkali base, ammonia, amino alcohols and the like. In embodiments, the alkali base may be NaOH.

The varnish disclosed herein may include at least one amino alcohol. At least one amino alcohol refers to, for example, from 1 to about 10 amino alcohols that are combined, such as from 1 to about 5 amino alcohols or from 1 to about 3 amino alcohols, in the varnish composition. An amino alcohol refers, for example, to a compound having amino group(s) associated with an alkyl alcohol or an aryl alcohol. For example, the alkyl alcohol may include from about 1 to about 36 carbon atoms, such as from about 1 to about 30 carbon atoms or from about 1 to about 15 carbon atoms. An alkyl alcohol may be linear, branched or cyclic and includes, for example, methanol, ethanol, propanol, isopropanol and the like. Aryl alcohols may include from about 6 to 36 carbon atoms, such as from about 6 to about 30 carbon atoms or from about 6 to about 15 carbon atoms. An aryl alcohol includes, for example, cyclobutyl, cyclopentyl, phenyl and the like. One or more amino groups refers to, for example, from about 1 to about 10 amino groups, such as from 1 to about 5 amino groups or from 1 to about 3 amino groups.

Examples of suitable amino alcohols for use herein include, 2-aminoethanol, 2-aminopropanol, 2-aminobutanol, 2-aminohexanol, 2-methyl-2-aminoethanol, 2-methyl-2-aminoethanol, 2-methyl-2-aminopropanol, 2-ethyl-2-aminoethanol, 2-ethyl-2-aminopropanol, 1-amino-2-propanol, 1-amino-2-butanol, 1-amino-2-pentanol, 3-amino-2-butanol, 2-amino-1,3-propanediol, 2-amino-2-ethyl-1,3-propanediol, 3-amino-1,2-propanediol and tris-(hydroxymethyl)-aminomethane, triisopropanolamine, 2-dimethylamino-2-methyl-1-propanol and similar substances.

The varnish may include the at least one base in an amount from about 1 weight percent to about 5 weight percent, such as from about 1 weight percent to about 4 weight percent or from about 1 weight percent to about 3 weight The varnish may further include at least one surfactant. At least one surfactant refers to, for example, from 1 to about 10 surfactants that are combined, such as from 1 to about 5 surfactants or from 1 to about 3 surfactants, in the varnish composition. This additional surfactant is not inclusive of any surfactant that may be included in the original latex emulsions. The surfactant added to the varnish may be included to assist in adjusting the surface tension of the varnish as more fully discussed below. Suitable surfactants for use herein include anionic surfactants, nonionic surfactants, silicone surfactants and fluorosurfactants.

Anionic surfactants may include sulfosuccinates, disulfonates, phosphate esters, sulfates, sulfonates, and mixtures thereof.

Examples of nonionic surfactants include polyvinyl alcohol, polyacrylic acid, isopropyl alcohol, acetylenic diols, octyl phenol ethoxylate, branched secondary alcohol ethoxylates, perfluorobutane sulfonates and alcohol alkoxylates.

Silicone surfactants are well known in the art and include polyether modified poly-dimethyl-siloxane and the like.

Examples of fluorosurfactants suitable for use herein may include ZONYL® FSO-100 (E.I. Du Pont de Nemours and Co., Wilmington, Del.), having the formula $RfCH_2CH_2O(CH_2CH_2O)xH$, wherein $Rf=F(CF_2CF_2)y$, x=0 to about 15, and y=1 to about 7, FLUORADS® FC430, FC170C, FC171, and the like, available from 3M, ethoxylated nonyl phenol from Aldrich, and the like, and fluorosurfactants based on perfluorobutane sulfonates.

The varnish composition may include one or more surfactants in a total amount from about 0.001 weight percent to about 5 weight percent, such as from about 0.001 weight percent to about 4 weight percent or from about 0.01 weight percent to about 3 weight percent, of the varnish. The total amount of surfactants in the varnish refers to the surfactant added to the varnish composition, not to any surfactant found in the latex emulsions. In other words, the amount of total surfactant is not inclusive of any surfactant that may be included in the latex emulsions.

Considering surfactants present in the latex emulsions, the total amount of surfactants in the varnish may be in the range of from about 1 to about 8, such as from about 2 to about 7 or from about 3 to about 5 weight percent, of the varnish composition. If one or more surfactants is utilized, each surfactant may be present in an amount from about 0.01 weight percent to about 7.99 weight percent of the varnish, such as from about 0.1 weight percent to about 7.9 weight percent or from about 1 weight percent to about 7 weight percent, of the varnish.

The varnish may further include at least one coalescing aid. At least one coalescing aid refers to, for example, from 1 to about 10 coalescing aids that are combined, such as from 1 to about 5 coalescing aids or from 1 to about 3 coalescing aids, in the varnish composition. Suitable coalescing aids for use herein include polyglycol ethers, such as butyl carbitol and DOWANOL® DPnB (Dow Corp), UCAR® Filmer IBT (Dow Corp), DOWANOL® DPnP (Dow Corp). The coalescing aid may be present in the varnish in an amount from 0 weight percent to about 8 weight percent, such as from about 0 weight percent to about 6 weight percent or from about 1 weight percent to about 4 weight percent, of the varnish.

The varnish may further include an anti-foaming agent, such as BYK®-019 and BYK®-028 (BYK Chemie GmbH), water based polysiloxane anti-foaming agents, available from Dempsey Corp, DAPRO® DF900 (Elementis Specialties), FOAMASTER® S (Cognis), or the equivalent. The anti-foaming agent may be present in the varnish in an amount from 0 weight percent to about 3 weight percent, such as from about 0 weight percent to about 2 weight percent or from about 0.1 weight percent to about 1 weight percent, of the varnish.

The varnish disclosed herein may optionally include one or more rheological or viscosity modifiers. One or more viscosity modifiers refers to, for example, from 1 to about 10 viscosity modifiers that are combined, such as from 1 to about 5 viscosity modifiers or from 1 to about 3 modifiers, in the varnish composition. Examples of viscosity modifiers include alkali-swellable acrylic thickeners, such as ACRYSOL® ASE-60 (available from Rohm & Haas), ACRYSOL® ASE-75, RHEOLATE® 450 and RHEOLATE® 420, and associative thickeners, such as ELEMENTIS RHEOLATE®255, RHEOLATE® 216 and RHEOLATE® 1.

The varnish may optionally include one or more viscosity modifiers in an amount from about 0.01 weight percent to about 8 weight percent, such as from about 0.01 weight percent to about 5 weight percent or from about 0.1 weight percent to about 5 weight percent, of the vanish.

The varnish incorporates water in an amount from about 30 weight percent to about 80 weight percent, such as from about 35 weight percent to about 75 weight percent or from about 40 weight percent to about 70 weight percent, of the varnish.

In embodiments, further conventional optional additives may include wax, matting agents, pigments, UV absorbers, biocides, crosslinking agents, and the like.

In embodiments, the varnish may include optional additives known to those skilled in the art in an amount from about 0.1 weight percent to about 8 weight percent, such as from about 0.1 weight percent to about 10 weight percent or from about 1 weight percent to about 10 weight percent, of the varnish.

Examples of waxes suitable for use herein include functionalized waxes, polypropylenes and polyethylenes. Suitable wax emulsions are available from Michaelman Inc., Daniels Products Company, Eastman Chemical Products, Inc., and Sanyo Kasei K.K. Commercially available polyethylenes usually possess a molecular weight of from about 1,000 to about 1,500, while the commercially available polypropylenes are believed to have a molecular weight of from about 4,000 to about 5,000. Examples of functionalized waxes include amines, amides, imides, esters, quaternary amines, carboxylic acids or acrylic polymer emulsions. Examples of polyethylene waxes include JONWAX 26 & 28 available from SC Johnson Wax, and chlorinated polypropylenes and polyethylenes commercially available from Allied Chemical, Petrolite Corporation and SC Johnson wax. When utilized, the wax may be present in the varnish in an amount from about 1 weight percent to about 8 weight percent, such as from about 1 weight percent to about 6 weight percent or from about 2 weight percent to about 5 weight percent, of the varnish composition.

Matting agents may be used in the formulation and may include silicas, silica gels, aluminum silicates and waxes, as described above, and the like.

Colorants may be employed in the varnish composition and may include pigments or dyes. In general, useful colorants or pigments include carbon black, magnetite, or mixtures thereof; cyan, yellow, magenta, or mixtures thereof; or red, green, blue, brown, or mixtures thereof. Specific useful colorants include Paliogen Violet 5100 and 5890 (BASF), Normandy Magenta RD-2400 (Paul Uhlich), Permanent Violet VT2645 (Paul Uhlich), Heliogen Green L8730 (BASF); Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD Red (Aldrich), Lithol Rubine Toner (Paul Uhlich), Lithol Scarlet 4440, NBD 3700 (BASF), Bon Red C (Dominion Color), Royal Brilliant Red RD-8192 (Paul Uhlich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Uhlich), Paliogen Yellow 152 and 1560 (BASF), Lithol Fast Yellow 0991K (BASF), Paliotol Yellow 1840 (BASF), Novaperm Yellow FGL (Hoechst), Permanent Yellow YE 0305 (Paul Uhlich), Lumogen Yellow D0790 (BASF), Suco-Gelb L1250 (BASF), Suco-Yellow D1355 (BASF), Sico Fast Yellow D1165, D1355 and D1351 (BASF), Hostaperm Pink F (Hoechst), Fanal Pink D4830 (BASF), Cinquasia Magenta (DuPont), Paliogen Black L0084 (BASF), Pigment Black K801 (BASF) and carbon blacks such as REGAL 330 (Cabot), Carbon Black 5250 and 5750 (Columbian Chemicals), and the like or mixtures thereof.

Additional useful colorants include pigments in water based dispersions such as those commercially available from Sun Chemical, for example SUNSPERSE BHD 6011X (Blue 15 Type), SUNSPERSE BUD 9312X (Pigment Blue 15 74160), SUNSPERSE BHD 6000X (Pigment Blue 15:3 74160), SUNSPERSE GHD 9600X and GHD 6004X (Pigment Green 7 74260), SUNSPERSE QHD 6040X (Pigment Red 122 73915), SUNSPERSE RHD 9668X (Pigment Red 185 12516), SUNSPERSE RHD 9365X and 9504X (Pigment Red 57 15850:1, SUNSPERSE YHD 6005X (Pigment Yellow 83 21108), FLEXIVERSE YFD 4249 (Pigment Yellow 17 21105), SUNSPERSE YHD 6020X and 6045X (Pigment Yellow 74 11741), SUNSPERSE YHD 6001X and 9604X (Pigment Yellow 14 21095), FLEXIVERSE LFD 4343 and LFD 9736 (Pigment Black 7 77226) and the like or mixtures thereof Other useful water based colorant dispersions commercially available from Clariant include HOSTAFINE Yellow GR, HOSTAFINE Black T and Black TS, HOSTAFINE Blue B2G, HOSTAFINE, Rubine 17613 and magenta dry pigment such as Toner Magenta 6BVP2213 and Toner Magenta E02 that may be dispersed in water and/or surfactant prior to use.

Other useful colorants include magnetites, such as Mobay magnetites M08029, M08060; Columbian magnetites: MAPICO BLACKS and surface treated magnetites; Pfizer magnetites CB4799, CB5300, CB5600, MCX6369: Bayer magnetites, BAYFERROX 8600, 8610; Northern Pigments magnetites, NP-604, NP-608; Magnox magnetites TMB-100, or TMB-104; and the like or mixtures thereof. Specific additional examples of pigments include phthalocyanine HELIOGEN BLUE L6900, D6840, D7080, D7020, PYLAM OIL BLUE, PYLAM OIL YELLOW, PIGMENT BLUE 1 available from Paul Uhlich & Company. Inc., PIGMENT VIOLET 1, PIGMENT RED 48, LEMON CHROME YELLOW DCC 1026, E.D. TOLUIDINE RED and BON RED C available from Dominion Color Corporation, Ltd., Toronto, Ontario, NOVAPERM YELLOW FGL, HOSTAPERM PINK E from Hoechst, and CINQUASIA MAGENTA available from E.I. DuPont de Nemours & Company, and the like. Examples of magentas include, for example, 2,9-dienethyl-substituted quinacridone and anthraquinone dye identified in the Color Index as CI 60710, CI Dispersed Red 15, diazo dye identified in the Color Index as CI 26050, CI Solvent Red 19, and the like or mixtures thereof. Illustrative examples of cyans include copper tetra(octadecyl sulfonamido)phthalocyanine, x-copper phthalocyanine pigment listed in the Color Index as CI74160, CI Pigment Blue, and Anthrathrene Blue, identified in the Color Index as Cl 69810, Special Blue X-2137 and the like or mixtures thereof; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dienethoxy-4-sulfonanilide phenylazo-4'-chloro-2,5-dienethoxy acetoacetanilide, and Permanent Yellow FGL. Colored magnetites, such as mixtures of MAPICO BLACK and cyan components may also be selected as pigments with the process disclosed herein. Colorants include pigment, dye, mixtures of pigment and dye, mixtures of pigments, mixtures of dyes, and the like. It is to be understood that other useful colorants will become readily apparent to one of skill in the art based on the present disclosure.

Dyes that are invisible to the naked eye but detectable when exposed to radiation outside the visible wavelength range (such as ultraviolet or infrared radiation), such as dansyllysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benzimidazole, derivatives of coumarin, derivatives of pyrazolines containing sulfonic acid groups, 4,4'-bis(triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl) stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable for use as a colorant.

In addition, suitable colorants that can be used herein include one or more fluorescent colorants, which can be pigments, dyes, or a mixture of pigments and dyes. For example, suitable fluorescent pigment concentrates are disclosed in, for example, U.S. Pat. No. 4,911,830, the entire disclosure of which is incorporated herein by reference, and suitable fluorescent colorants are disclosed in, for example, U.S. Pat. Nos. 4,243,694 and 5,554,480, the entire disclosures of which are incorporated herein by reference. Suitable inorganic fluorescent pigments can be prepared, for example, by adding trace amounts of activating agents such as copper, silver and manganese to high purity sulfides of heavy metals or alkaline earth metals such as zinc sulfide, which are used as raw materials, and calcining them at a high temperature. Suitable organic fluorescent pigments can be prepared, for example, by dissolving fluorescent dyes in the vehicles of synthetic resins or ones prepared by dyeing the dispersed matters of fine resin particles obtained by emulsion polymerization or suspension polymerization with fluorescent dyes. The synthetic resins can include, but are not limited to, vinyl chloride resins, alkid resins and acrylic resins, and the fluorescent dyes include, but are not limited to, C.I. acid yellow 7, C.I. basic red 1 and the like.

Although not limited thereto, suitable fluorescent dyes include, but are not limited to, those belonging to the dye families known as rhodamines, fluoresciens, coumarins, naphthalimides, benzoxanthenes, acridines, azos, and the like. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160 and Fluorescent Brightner 61. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17-N, and the like.

UV absorbers may be included in the varnish composition and may include benzophenone derivatives (such as SANDUVOR® 3041), hydroxyphenyltriazine (SANDUVOR® TB-01), CIBAFAST® HLiq, and CIBA TINUVIN® 1130.

Biocides may be incorporated into the varnish composition and may include organosulfur, organohalogens, phenates, chlorophenates, heterocyclic nitrogen compounds, organic esters, quaternary ammonium compounds, inorganic boron compounds, and the like.

Crosslinking agents suitable for use herein include thermosetting resins, such as CYMEL® 303, and oxalic acid.

The viscosity of the varnish prior to drying may be from about 50 cP to about 750 cP, such as from about 100 cp to about 700 cP or from about 100 cP to about 650 cP, at room temperature (approximately 25° C.). The static surface tension of the varnish prior to drying may be from about 15 mN/m to about 40 mN/m, such as from about 20 mN/m to about 40 mN/m or from about 20 mN/m to about 30 mN/m.

The varnish may be applied to any type of substrate, such as, for example, paper, cardboard, etc., to completely wet the surface. The varnish adheres well to both coated and uncoated substrates, such as coated and uncoated paper. The substrate may contain additives including anti-curl compounds, such as, for example, trimethylolpropane, biocides, humectants, chelating agents, and mixtures thereof, and any other optional additives known in the art for enhancing the performance and/or value of the ink and/or the substrate.

The varnish may be applied to the substrate at any suitable time after image formation. For example, the varnish may be applied to the substrate immediately after the image is formed, such as in an inline coating apparatus where the printing and overcoating are conducted by the same printing device, of after a short or long delay after printing, such as in an offline coating apparatus where the printing and overcoating are conducted by different printings devices. Furthermore, the varnish may be applied over the entire substrate, the entire image, parts of the substrate, or parts of the image. For example, the composition may be applied to both imaged areas and non-imaged areas or it can be applied only to imaged areas, and the like. In embodiments, the varnish is applied over the entire substrate, including imaged and non-imaged areas, to provide more image robustness. The varnish adheres well to both the substrate in non-imaged areas and to the ink of imaged areas on the substrate. The ink-based image on the substrate may have been previously prepared by any suitable printing process known in the art of ink jetting devices.

The varnish compositions having water may wet a hydrophobic ink layer by adjusting the surface tension and/or viscosity of the varnish composition. The surface tension of the varnish can be adjusted by the addition of surfactants. Ideally, the surface tension of the varnish must closely match the surface tension of both the ink and the residual oil, which may be present from the imaging process. A close match will ensure complete wetting of the image.

The viscosity of the varnish may also be adjusted with the use of rheological modifiers. A higher viscosity coating may aid in better film formation, thereby ensuring a continuous film over the substrate. The varnish itself may lay over the ink image and substrate, thereby increasing robustness as it provides a first line of defense, i.e., the varnish may be removed before the ink is contacted and/or removed.

Liquid film coating devices can be used for applying the varnish composition, including roll coaters, rod coaters, blades, wire bars, air-knives, curtain coaters, slide coaters, doctor-knives, screen coaters, gravure coaters, such as, for example, offset gravure coaters, slot coaters, and extrusion coaters. Such devices may be used in a known manner, such as, for example, direct and reverse roll coating, offset gravure, curtain coating, lithographic coating, screen coating, and gravure coating. In embodiments, coating of the varnish is accomplished using a two or three roll coater.

In embodiments, the varnish disclosed herein may be applied to an image or a substrate with an image after the ink has substantially dried on the substrate.

Ink jet printing processes may employ inks that are solid at room temperature and liquid at elevated temperatures. Such inks may be referred to as phase change inks. Phase change inks suitable for use herein may include an ink, vehicle that is solid at temperatures of about 20° C. to about 27° C., for example room temperature, and specifically are solid at temperatures below about 40° C. However, the inks change phase upon heating, and are in a molten state at jetting temperatures. Thus, the inks have a viscosity of from about 1 to about 20 centipoise (cP), such as from about 5 to about 15 cP or from about 8 to about 12 cP, at an elevated temperature suitable for ink jet printing, such as temperatures of from about 50° C. to about 150° C.

In this regard, the inks herein may be low energy inks. Low energy inks are solid at a temperature below about 40° C. and have a viscosity of from about 5 to about 15 cP at a jetting temperature of from about 50° C. to about 150° C., such as from about 70° C. to about 120° C. or from about 80° C. to about 120° C. The inks jet at lower temperatures as above, and thus require lower amounts of energy for jetting.

The ink image discussed herein may be formed from any such suitable phase change ink, for example, those inks disclosed in U.S. Pat. Nos. 4,490,731, 5,006,170 and 5,122,187, the disclosures of which are incorporated herein by reference in their entirety.

Phase change ink jet processes are well known and are described, for example, in U.S. Pat. Nos. 4,601,777, 4,251,824, 4,410,899, 4,412,224 and 4,532,530, the disclosures of which are incorporated herein by reference in their entirety.

The varnish dries upon application to the substrate and/or on exposure to heat and/or air. Application of UV light is not necessary to dry the varnish. However, a UV lamp may be used to dry the varnish, for example when used as a heat source. Upon drying, the varnish may also harden.

The varnish dries more rapidly at slightly elevated temperatures, for example above 25° C. In embodiments, the varnish dries at temperatures from about 25° C. to about 90° C., such as from about 25° C. to about 80° C. or from about 25° C. to about 60° C. The varnish dries at temperatures less than the melting temperature of the ink. The varnished substrate (with or without image) may be placed on a belt that passes under a heat source having a temperature of from about 25° C. to about 70° C., such as from about 25° C. to about 65° C. or from about 25° C. to about 60° C., to effect drying. The speed at which the varnish may be dried and hardened is from about 0 ft/min. to about 100 ft/min., such as from about 10 ft/min. to about 100 f/min. or from about 20 ft/min. to about 100 ft/min. The varnish may be dried and hardened under these condition for about 0.5 second to about 20 seconds, such as for about 1 second to about 15 seconds or for about 1 second to about 10 seconds.

When applied, for example when the varnish is wet, the varnish may be applied to have a thickness from about 2 μm to about 10 μm, such as from about 2 μm to about 8 μm or from about 3 μm to about 7 μm. When the varnish has dried and hardened, it has a thickness of from about 0.5 μm to about 5 μm such as from about 0.5 μm to about 4 μm or from about 1 μm to about 3 μm.

In embodiments, the varnish disclosed herein may be prepared by first blending the latex emulsion, or more than one latex emulsion, as described above. The additional water and surfactant may then be independently added to the latex emulsion mixture, and then mixed. As discussed above, more than one surfactant may be pre-blended before being added to the aqueous mixture. The surfactants suitable for use herein are described in more detail above. After the one or more surfactants is blended with the more than one latex emulsion, a viscosity modifier, as described above, may optionally be added to achieve the viscosity levels disclosed herein. Each of these steps takes place at room temperature, for example, from about 20° C. to about 27° C.

The base is added to the mixture. This may be done by, for example, drop-wise addition of the base. Sufficient base is added such that the pH of the varnish composition is from about 8 to about 10, such as from about 8 to about 9.5 or from about 8.5 to about 9.5. If the viscosity of the varnish is adversely affected by the addition of the base, another viscosity modifier may be added to further adjust the viscosity to the levels discussed above.

The following Examples are submitted to illustrate embodiments of the present disclosure.

EXAMPLE 1

An example of a varnish that can be selected for use in the parameters of xerographic printing and the method of making such a varnish is set forth below in Table 1.

TABLE 1

Formulation Components

| Component | Chemical Composition | Amount (wt. percent) |
|---|---|---|
| Latex Emulsion | Acrylic Emulsion (Rohm & Haas RHOPLEX ® HA-12) | 46.4-54.4 |
| Latex Emulsion | Acrylic Emulsion (Rohm & Haas RHOPLEX ® I-2074) | 31.7-39.7 |
| Water | Deionized Water | 2.9 |
| Alkali Base | NaOH Solution (50% in water) | 3.65 |
| Surfactant(s) | AP 504: Butanedioic acid, 1,4-Bis(2-ethylhexyl) ester, Sodium Salt FC4432: Perfluorobutane sulfonate | 0.75 |

TABLE 1-continued

Formulation Components

| Component | Chemical Composition | Amount (wt. percent) |
|---|---|---|
| Viscosity Modifier | Alkali swellable, crosslinked, acrylic thickener (Rohm & Haas ACRYSOL ® ASE-60) | 3.6 |
| Coalescing Aid | 2-(2-butoxyethoxy)ethanol (butylcarbitol) | 2.5 |
| Anti-Foaming Agent | Mixture of hydrophobic solids and foam destroying polysiloxanes in polyglycol (BYK ® 028) | 0.5 |

The RHOPLEX® HA-12 and RHOPLEX® 1-2074 were blended together with medium shear (approximately 500 RPM) and allowed to mix for approximately thirty minutes. Surfactants (SURFYNOL® 504 and NOVEC® FC 4432, pre-blended in a 90:10 ratio) were independently added in a dropwise fashion to the latex emulsions and allowed to mix for an additional thirty minutes. Water and an anti-foaming agent (BYK® 028) were then added and the resulting mixture was stirred with medium shear for about one hour. After sufficient mixing, the ACRYSOL® ASE-60 was added to the formulation and allowed to blend for about one hour. After the allotted time a pH meter was inserted into the mixture in order to monitor the pH of the coating, and the shear was increased to a higher rate of about 900 RPM. A 50% sodium hydroxide solution was added in a drop wise fashion n and the pH was allowed to equilibrate between additions. The final pH was approximately 8.5. The butyl carbitol was then added and the mixture was stirred for about thirty minutes.

At this point, the coating was may be measured for viscosity. If the viscosity is less than 130 centipoise at room temperature, then small additions of RHEOLATE® 450 may be added in order to increase the viscosity to approximately to about 140 centipoise or to about 600 centipoise.

EXAMPLE 2

Sample ink images were imaged and printed using low energy solid ink jetted from piezo ink jet heads in accordance with manufacturer's set temperature and speed for an "extra heavyweight" setting. Sample images were made on the papers listed in Table 2 below.

TABLE 2

Papers for Sample Images

| Paper Name | Coated/Uncoated | Basis Weight |
|---|---|---|
| White McCoy Gloss Cover | Coated | 100 pound |
| Xerox Digital Colour Xpressions | Uncoated | 80 pound |

For coating, the paper was attached to a lead sheet and fed through a lab coater at a speed of 30 meters/minute. The image was then placed on the belt of a fusion UV system at a speed approximately 18.3 meters/minute and allowed to dry under heat generated by the UV lamp (54.4° C.). The 140 lines per inch roll in the coater resulted in a coating thickness of approximately 1.5 to 2 µm, when dry. Under these conditions, the formulation set forth above provided sufficient wetting to allow for a uniform coating over a solid ink jet print.

EXAMPLE 3

The gloss of coated and uncoated papers was measured using a BYK-Gardner glossmeter set at a 60° C. reflection angle. The results are set forth in Table 3 below.

TABLE 3

Gloss Measured at 60°

| Paper Type | Print with No Coating | Print with Coating |
|---|---|---|
| McCoy Gloss Cover (100 pound) | 27.0 ± 0.5 | 55.2 ± 0.6 |
| Xerox Digital Colour Xpressions (80 pound) | 29.6 ± 0.4 | 55.3 ± 3.5 |

EXAMPLE 4

Scratch resistance was carried out using the linear Taber Abraser apparatus. A 0.005 radius steel tip was loaded with 180 grams and a series of 9 scratch cycles was carried out. The results of the scratch result may be summarized as follows:

Uncoated McCoy Gloss: paper, i.e., white area, was evident due to the scratch test (prior to the scratch test a uniform layer of ink was on the paper).

Coated McCoy Gloss: there were no ink-deprived areas, however, the varnish was removed.

Uncoated Digital Colour Xpressions: the scratched area had remnants of ink clinging to the paper fibers (the fibers are clearly visible).

Coated Uncoated Digital Colour Xpressions: although the varnish was removed by the scratch test, the ink was not removed or scratched off.

Conclusion: it is apparent that the varnish coated over a solid ink jet print greatly increased the scratch resistance of the print.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A recording medium with an ink image thereon, wherein a varnish at least partially covers the ink image, and wherein the varnish is applied to the recording medium as a varnish composition, wherein the varnish composition comprises at least one latex emulsion selected from the group consisting of styrene/acrylic emulsions, acrylic emulsions, polyester emulsions, and mixtures thereof, water, at least one base, at least one coalescing aid, at least one viscosity modifier comprising an acrylic alkali swellable emulsion or an associative thickener, and at least one surfactant, wherein the latex emulsion is from about 40 weight percent to about 95 weight percent of the varnish composition, the total amount of water is from about 30 weight percent to about 80 weight percent of the varnish composition, the coalescing aid is from about 1 weight percent to about 4 weight percent of the varnish composition, and the viscosity modifier is from about 0.1 weight percent to about 5 weight percent of the varnish composition.

2. The recording medium with an ink image thereon according to claim 1, wherein the varnish composition further comprises at least one anti-foaming agent.

3. The recording medium with an ink image thereon according to claim 1, wherein the at least one latex emulsion comprises a self-crosslinking and/or alkali soluble latex emulsion.

4. The recording medium with an ink image thereon according to claim 1, wherein the at least one base is NaOH, ammonia, or an amino alcohol.

5. The recording medium with an ink image thereon according to claim 1, wherein the at least one surfactant is an anionic surfactant, a nonionic surfactant, a silicone surfactant, a fluorosurfactant or mixtures thereof.

6. The recording medium with an ink image thereon according to claim 5, wherein the anionic surfactant is selected from the group consisting of sulfosuccinates, disulfonates, phosphate esters, sulfates, sulfonates and mixtures thereof.

7. The recording medium with an ink image thereon according to claim 5, wherein the fluorosurfactant is based on perfluorobutane sulfonates.

8. The recording medium with an ink image thereon according to claim 1, wherein the nonionic surfactant is selected from the group consisting of polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, poly oxyethylene nonylphenyl ether, dialkylphenoxy poly (ethyleneoxy) ethanol, isopropyl alcohol, acetylenic diols, octyl phenol ethoxylates, branched secondary ethoxylates, and mixtures thereof.

9. The recording medium with an ink image thereon according to claim 1, wherein the at least one base is from about 1 weight percent to about 5 weight percent of the varnish composition, and the at least one surfactant is from about 0.01 weight percent to about 7.99 weight percent of the varnish composition.

10. The recording medium with an ink image thereon according to claim 1, wherein a total glass transition temperature of the at least one latex emulsion is from about 30° C. to about 95° C.

11. The recording medium with an ink image thereon according to claim 1, wherein the varnish composition has a surface tension from about 15 mN/m to about 40 mN/m.

12. The recording medium with an ink image thereon according to claim 1, wherein the varnish composition has a viscosity from about 50 cP to about 750 cP at approximately room temperature.

13. The recording medium with an ink image thereon according to claim 1, wherein the varnish composition as applied has a thickness of from about 2 μm to about 10 μm, and as dried has a thickness of from about 0.5 μm to about 5 μm.

14. The recording medium according to claim 1, wherein the varnish composition covers the entire ink image.

15. The recording medium according to claim 1, wherein the varnish composition is dried following application to form a varnish.

16. A varnish composition, consisting essentially of at least one latex emulsion selected from the group consisting of a styrene/acrylic emulsion, an acrylic emulsion, a polyester emulsion and mixtures thereof, water, at least one surfactant, at least one coalescing aid, at least one viscosity modifier comprising an acrylic alkali swellable emulsion or an associative thickener, and at least one base, wherein the at least one base is ammonia, and wherein the latex emulsion is from about 40 weight percent to about 95 weight percent of the varnish composition, the total amount of water is from about 30 weight percent to about 80 weight percent of the varnish composition, the coalescing aid is from about 1 weight percent to about 4 weight percent of the varnish composition, and the viscosity modifier is from about 0.1 weight percent to about 5 weight percent of the varnish composition.

* * * * *